MAGNETIC RECORDING APPARATUS

Filed March 9, 1946

Inventor
MARVIN CAMRAS by The Firm of Charles W. Hills Attys.

Patented Feb. 7, 1950 2,496,441

UNITED STATES PATENT OFFICE 2,496,441

MAGNETIC RECORDING APPARATUS

Marvin Camras, Chicago, Ill., assignor to Armour Research Foundation of Illinois Institute of Technology, Chicago, Ill., a corporation of Illinois Application March 9, 1946, Serial No. 653,238

7 Claims. (Cl. 179—100.2)

Figure 1:
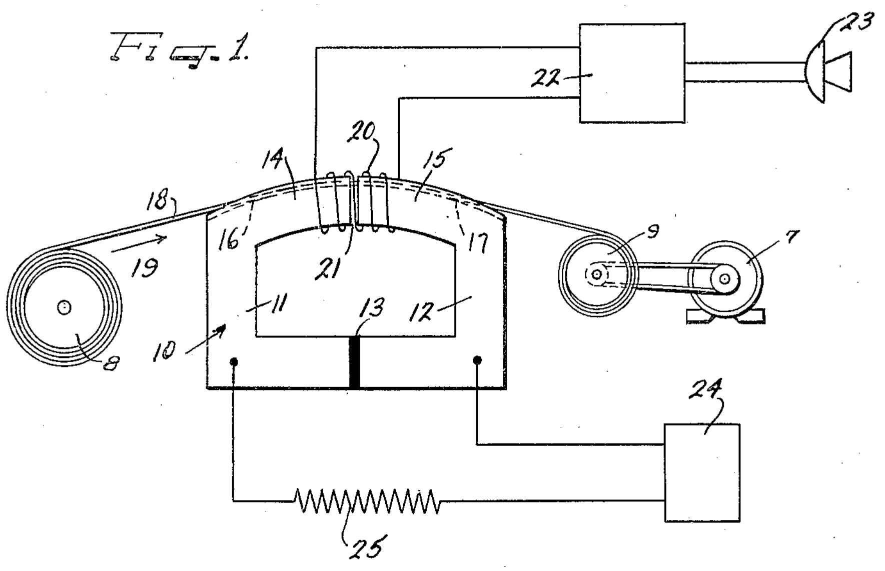

This invention relates to a magnetic recording method and means and more particularly to a novel method and means for supplying a high frequency component to the recording head, and to a novel method and means for erasing and making a magnetic recording on a traveling record medium.

Many of the most successful magnetic recorders of the present day employ a high frequency bias or high frequency component in conjunction with the audio current which is being recorded on a traveling record medium. The usual practice is to demagnetize the traveling record medium and thereafter pass the same traveling record medium through a magnetic field which is established by the joint action of a fluctuating signal of which a record is to be made, and a high frequency current.

One of the principal features and objects of the present invention is to provide a novel magnetic recording method and means wherein the wire is subjected to the action of a circular high frequency magnetic field at the time that the fluctuating signal is being recorded by establishing a longitudinal magnetic field.

A further object of the present invention is to subject a traveling record medium to a high frequency field which lies in a plane transverse to the longitudinal axis of the traveling record medium and simultaneously subject it to the action of a fluctuating magnetic field disposed substantially parallel to the direction of motion of the traveling record medium which is established by the fluctuating signal energy of which the record is to be made.

A still further object of the present invention is to demagnetize a traveling record medium in a plane substantially at right angles to the longitudinal axis of the traveling record medium and thereafter pass the demagnetized record medium through a field established by the joint action of a high frequency current and a fluctuating signal current, the high frequency current tending to establish a field substantially at right angles to the longitudinal axis of the record medium and the signal current tending to establish a field substantially parallel to the longitudinal axis of the record medium.

Still another and further object of the present invention is to demagnetize a traveling record medium by a circular magnetic field lying in a plane substantially at right angles to the longitudinal axis of the record medium and thereafter subject the traveling record medium to the joint action of a field which tends to be a circular field in a plane at right angles to the longitudinal axis of the record medium and a second field which tends to lie in a direction parallel to the longitudinal axis of the record medium.

Figure 2:
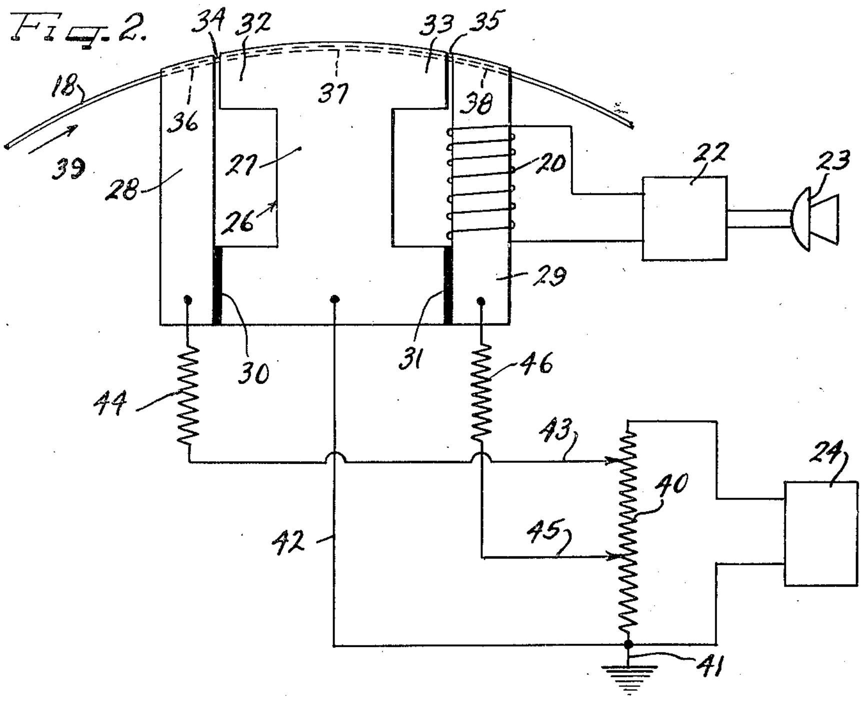

The novel features which I believe to be characteristic of my invention are set forth with particularity in the appended claims. My invention itself, however, both as to its organization, manner of construction and method of operation, together with further objects and advantages thereof, may best be understood by reference to the following description, taken in connection with the accompanying drawing, in which:

Figure 1 is a diagrammatic sketch of one embodiment of my invention wherein a traveling wire is subjected to the joint action of a circular high frequency magnetic field and a longitudinal fluctuating signal field; and Figure 2 is a schematic diagram of a modified form of my invention wherein both the erase field and the high frequency bias field are circular fields at right angles to the longitudinal axis of the traveling record medium.

In the embodiments of the invention illustrated herein, the circular fields are established by causing the traveling record medium itself to carry the high frequency current at the point where it crosses again in the recording head. It has been found that this does not interfere with the signal being recorded which in any way is disadvantageous. This is probably particularly true due to the fact that the high frequency field is at right angles to the field established by the signal current, and for the further reason that the high frequency current is preferably of a frequency sufficiently high that it cannot be resolved onto the traveling record medium during the short interval that any particular point on the record medium is passing through the gap.

In Figure 1 of the drawing a magnetic recorder head 10 is diagrammatically illustrated which is made up of two C-shaped halves 11 and 12 connected together at the base by an insulating strip 13 which is formed of any suitable dielectric material. The two C-shaped members 11 and 12 may be of any suitable magnetic material having relatively low retentivity and relatively high permeability. The two C-shaped sections 11 and 12 provide two confronting polar portions 14 and 15. The top surface of these pole portions 14 and 15 are preferably grooved as at 16 and 17 to receive a traveling record medium 18, which, in this case, is illustrated as being a wire. The wire 18 may be of any suitable magnetic material having a coercive force which is sufficiently high to retain a record magnetically recorded thereon.

This wire 18 lies in the slots or grooves 17 and travels in a direction which is longitudinal of its own axis. For example, the wire 18 may be caused to travel from left to right from a supply reel 8 to a take-up reel 9 driven by a motor 7, the direction of travel of the wire being as illustrated by the arrow 19. No means is shown for causing the wire 18 to travel through the head 10 for such means forms no part of the present invention. It will, however, be understood that during the recording process the wire 18 does travel through the head 10, as indicated by the arrow.

A signal coil 20 is mounted on the recording head 10, and in this particular instance has been shown as disposed around the gap 21 which lies between the polar portions 14 and 15. The signal coil 10 is connected to the output of an audio amplifier 22 which amplifies a signal current to be recorded. This signal current may be, for example, current obtained from a microphone 23, which is diagrammatically represented as being connected to the input of the audio amplifier 22. From the drawing it will be understood that when fluctuating current flows through the coil 20 a fluctuating magnetic field is established in the gap 21 which is parallel to the direction of motion of the wire 18 as it passes across again.

High frequency current is supplied from a suitable source of high frequency 24 which may, for example, be any suitable form of electronc oscillator. When the signal current is produced by audible sound picked up by the microphone 23 the high frequency current is mixed with it in the head 10. The high frequency source 24 is preferably set to operate at somewhere in the range between 20 to 100 kilocycles. One side of the high frequency source 24 is connected to the C-shaped section 11 of the recorder head 10 through a high impedance 25. The other side is directly connected to the C-shaped section 12 of the magnetic recorder head 10. Since the dielectric insert 13 prevents the current from crossing between the sections 11 and 12 to close the load circuit of the high frequency source 24, it will be apparent that the current will travel through the wire 18 at the gap 21.

While the wire 18 is continually changing its position as it crosses the gap 21, it will be noted that there is always a section of wire lying across the gap 21 which closes the load circuit of the high frequency oscillator 24. The impedance element 25 is a load resistance and is of relatively high value in order not to have a direct short circuit across the high frequency source and in order to prevent any substantial changes in the current which might otherwise occur due to changes in contact resistance.

Since the high frequency current is flowing through the wire 18 at the gap 21 in a longitudinal direction, it will immediately be apparent that the magnetic field tends to be established by this flow of current which is a circular magnetic field lying in a plane normal to the longitudinal axis of the wire. The magnetic field thus tends to reverse in a circular direction in a plane at right angles to the longitudinal axis of the wire.

It has been found that a high frequency biasing component at right angles to the recorded signal field produces very satisfactory results, and this is particularly true where the high frequency field is a circular field.

In Figure 2 of the drawing I have illustrated a modified form of the present invention wherein a circular field is also used to demagnetize the wire. In this illustrated embodiment of the modified form of the invention, a recorder head 26 is provided which is made up of an I-shaped center leg 27 and two straight upstanding outer legs 28 and 29. The outer leg 28 is physically connected to the center leg 27 through an insulating block 30. Similarly, the other outer leg 29 is connected to the center leg 27 through an insulating block 31. These insulating blocks 30 and 31 may be of any suitable dielectric material.

The top of the I-shaped center section 27 includes a polar portion 32 and a polar portion 33 which extend, respectively, toward the outer legs 28 and 29, but stop just short thereof to provide non-magnetic gaps 34 and 35. It will be noted that the gap 34 is slightly larger than the gap 35 and this is desirable since the gap 34 is the gap used to demagnetize the wire, while the gap 35 is the one used to record a signal on the wire. The top of the recorder head 26 is grooved to receive the wire 18 by providing suitable grooves 36, 37 and 38 in the legs 28, 27 and 29 respectively. Means (not shown) is provided to cause the wire 18 to travel through the head 26 in the direction indicated by the arrow 39.

The voice coil 20, in this case, is mounted on the upstanding leg 29, and is connected to the output of the audio amplifier 22 which in turn is connected to a microphone 23, as described in connection with Figure 1.

The high frequency source 24 is connected to a voltage divider or potentiometer 40 which is preferably grounded as at 41 at its lower end. The grounded lower end of the potentiometer is connected through a conductor 42 of the center leg 27 of the head 26. The leg 28 of the head 26 is connected from a movable contact element 43 on the potentiometer 40 through a load impedance 44. The leg 29 is connected from a movable contact 45 on the potentiometer 40 through a load impedance 46. Since the current which is necessary to erase or demagnetize the wire 18 must be substantially greater than the current which is desired to supply the high frequency for the recording process, the voltage applied across the legs 28 and 27 must be substantially greater than the voltage applied across the legs 29 and 27. This is done by the movable contact elements 43 and 45 on the potentiometer 40.

From the above description it will be apparent that as the wire 18 travels across the gap 34 it is demagnetized by a high frequency circular magnetic field established by the flow of high frequency current through the portion of the wire which is lying betwen the polar portion 32 of the center leg 27 and the upstanding leg 28. It is thereafter magnetically recorded on by passing it through a magnetic field in the gap 35 which is established by the joint action of the longitudinal magnetic field set up by the signal coil 20 and the circular high frequency magnetic field set up by the high frequency current flowing through the wire itself in the gap 35.

While in the preferred form of the invention the high frequency current flows through the wire, the process may be reversed and the audio current may flow through the wire.

While I have shown a particular embodiment of my invention, and described a particular method of operation, it will, of course, be understood that I do not wish to be limited thereto, since many modifications may be made and I therefore contemplate, by the appended claims, to cover all such modifications as fall within the true spirit and scope of my invention.

I claim as my invention:

1. Means for magnetically recording fluctuating signal energy on a traveling elongated magnetizable record member comprising a magnetic recording head including a core having a pair of confronting polar portions spaced to form a non-magnetic gap therebetween through which said member travels from one polar portion to the other, a signal coil, means for energizing said coil with fluctuating electric energy representing the signal to be recorded, said signal coil being mounted on said core in such a position as to produce a fluctuating magnetic field in said gap when said coil is energized, said core being separated at a second point remote from said gap so as to form two parts electrically separated from each other and each including one polar portion, and means for connecting said parts to opposite sides of a source of high frequency current, whereby high frequency current flows through the portion of said record member which is spanning said gap.

2. Means for magnetically recording fluctuating signal energy on a traveling elongated magnetizable record member comprising a magnetic recording head including a core having a pair of confronting polar portions spaced to form a non-magnetic gap therebetween through which said member travels from one polar portion to the other, a signal coil, means for energizing said coil with fluctuating electric energy representing the signal to be recorded, said signal coil being mounted on said core in such a position as to produce a fluctuating magnetic field in said gap when said coil is energized, said core being separated at a second point remote from said gap so as to form two parts electrically separated from each other and each including one polar portion, an insulating block of dielectric material between said parts and said separated point, a source of high frequency current, a load resistance, said source of high frequency current being connected to said parts through said load resistance, whereby high frequency current flows through the portion of said record member which is spanning said gap as it travels thereacross.

3. Means for magnetically recording fluctuating signal energy on a traveling elongated magnetizable record member comprising a magnetic recording head including a core of magnetic material of low retentivity, said core being formed of two C-shaped portions positioned in confronting relationship with their legs in spaced confronting relationship to define a magnetizing gap and a second gap, said second gap being filled by an electrical insulating block, said recording head being arranged to have said traveling record member pass therethrough across said first gap, a signal coil wound around at least one of said C-shaped core member parts, means for energizing said coil with fluctuating electric energy representing the signal to be recorded, a load resistance, a source of high frequency current, means for connecting one side of said source of high frequency to one of said C-shaped parts, and the other side of said source of high frequency through said load resistance to the other of said C-shaped parts.

4. Means for magnetically recording fluctuating signal energy on a traveling elongated magnetizable record member comprising a magnetic recording head including a core of low retentivity magnetic material formed in three parts electrically separated from each other and including two pairs of polar portions spaced to provide an erasing gap and a recording gap, two of said polar portions being on one of said core parts, said traveling elongated record medium being arranged to pass first across said erase gap and then across said recording gap, means for connecting a source of high frequency electric current directly to said polar portions defining said erase gap, means for connecting a high frequency current of lower amplitude than said first high frequency current directly to said polar portions defining said recording gap, a signal coil mounted on said recording head, means for energizing said coil with fluctuating electric energy representing the signal to be recorded, said signal coil being mounted on said core in such a position as to produce a fluctuating magnetic field across said recording gap when said coil is energized.

5. A magnetic recorder comprising a recorder head through which an elongated magnetizable record member is arranged to pass, said head including an I-shaped center leg and an outer leg on either side of said I-shaped center leg, said outer legs being electrically separated from said center leg at the bottom and being spaced from said center leg at the top to form a demagnetizing gap and a recording gap, a signal coil wound around said outer leg which is spaced from said center leg to define said recording gap, means for energizing said signal coil with fluctuating electric energy, and whose highest frequency is low enough to be resolved by said recording gap, a source of high frequency, a potentiometer connected across said source of high frequency and having one end thereof grounded, a pair of load resistances, a pair of movable contacts on said potentiometer, one of the outer legs of said recorder head being connected through one load resistance to one movable contact and the other outer leg being connected through the other load resistance to the other movable contact, whereby high frequency current of relatively high magnitude may be caused to pass through the portion of said record member spanning said erase gap and relatively low magnitude high frequency current is caused to pass through the portion of said record member spanning said recording gap.

6. Means for magnetically recording a signal on a traveling magnetizable record medium comprising a magnetizable record medium, means for setting up a fluctuating signal magnetic field, means for superimposing on said first field and oriented at a right angle thereto a fluctuating magnetic field of higher frequency, and means for passing said record medium through said superimposed magnetic fields, one of said magnetic fields being substantially parallel to the direction of travel of the wire.

7. Means for magnetically recording a signal on a traveling magnetizable record medium comprising a magnetizable record medium, means for setting up a fluctuating signal magnetic field, means for superimposing a fluctuating circular magnetic field of higher frequency on said first field and at a right angle thereto, said second field lying in a plane substantially normal to the direction of travel of the record medium, and means for passing said record medium through said superimposed magnetic fields.

MARVIN CAMRAS.

REFERENCES CITED

The following references are of record in the file of this patent:

UNITED STATES PATENTS

| Number | Name | Date |
|---|---|---|
| 1,993,616 | Nakken | Mar. 5, 1935 |
| 2,351,003 | Camras | June 13, 1944 |
| 2,351,005 | Camras | June 13, 1944 |
| 2,351,009 | Camras | June 13, 1944 |
| 2,425,213 | Sunstein | Aug. 5, 1947 |
| 2,458,315 | Sunstein | Jan. 4, 1949 |

FOREIGN PATENTS

| Number | Country | Date |
|---|---|---|
| 691,711 | France | Oct. 24, 1930 |
| 594,991 | Germany | Mar. 24, 1934 |